United States Patent Office 2,761,860
Patented Sept. 4, 1956

2,761,860

SYNTHESIS OF THIAMORPHOLINE

Bruce W. Horrom and Armiger H. Sommers, Waukegan, Ill., assignors to Abbott Laboratories, North Chicago, Ill., a corporation of Illinois No Drawing. Application September 30, 1953, Serial No. 383,383

6 Claims. (Cl. 260—243)

This invention relates to a new synthesis of thiamorpholine and more particularly to a reduction of keto-thiazanes by lithium aluminum hydride to form thiamorpholine in good yield.

Thiamorpholine is an interesting compound which might have many applications in the chemical industry if it were more readily available at moderate cost. Interesting compounds such as the surface active agents of U. S. Patent No. 2,541,714 have been prepared by reacting N-alkylthiamorpholine with a dialkyl sulfate. Thiamorpholine can be readily N-alkylated to form N-alkyl-1,4-thiazanes which are the starting materials for the products shown in the aforementioned patent.

The previously known syntheses of thiamorpholine require as starting materials either $\beta$-mercaptoethylamine or mustard gas, bis-($\beta$-chloroethyl)-sulfide. These materials are not readily available nor are they conveniently usable intermediates, and the yields obtained by these procedures are not satisfactory.

It is therefore a principal object of this invention to make thiamorpholine in good yield by a convenient process employing readily available materials.

According to the practice of the invention thiamorpholine has now been prepared in good yield by the reduction of a keto-1,4-thiazane with lithium aluminum hydride. In general terms the reaction takes place by dissolving or partially dissolving a keto-1,4-thiazane and lithium aluminum hydride in an organic solvent which is capable of at least partially dissolving both compounds and bringing them together. The thiamorpholine is then recovered from the reaction mixture by distillation.

The keto-1,4-thiazanes which are used as starting materials in this synthesis are known in the literature. For example, 3-keto-1,4-thiazane was described by H. Bestian in Ann. 566, 242 (1950) and 3,5-diketo-1,4-thiazane was published by C. Barkenbus and P. S. Landis in the Journal of the American Chemical Society, 70, 684, (1948).

While ethyl ether is used as the solvent in the examples, we may also use dibutylether, tetrahydrofuran, or any other organic solvent which is capable of at least partially dissolving both lithium aluminum hydride and the thiazane without reacting with either.

The following examples are presented in order to describe the invention in greater detail. It should be understood, however, that the invention is not intended to be limited in any way by the examples.

Example I

A one liter, 3-neck, round bottom flask is charged with 18.1 g. of lithium aluminum hydride and 600 ml. of anhydrous ethyl ether. The mixture is stirred under a nitrogen atmosphere, and heated so that the solvent refluxes, slowly dissolving 33 g. of 3-keto-1,4-thiazane (H. Bestian, Ann., 566, 242, 1950) held in a Soxhlet-type apparatus, and returning to the reaction flask. The reaction is complete in about six hours, and then 45 ml. of water is slowly added to the mixture to hydrolyze the reaction complex and any excess lithium aluminum hydride. The mixture is filtered and the solid is washed with more dry ether. The combined filtrates are distilled, and 21.1 g. of thiamorpholine, B. P. 173–175° C. is obtained as a colorless liquid.

Example II

Using the same method as disclosed in Example I, 13.1 g. of 3,5-diketo-1,4-thiazane (C. Barkenbus and P. S. Landis, J. Am. Chem. Soc. 70, 684 1948) is reduced using 9.9 g. of lithium aluminum hydride to yield 4.4 g. of thiamorpholine, having a B. P. 173–177° C.

Others may practice the invention in any of the numerous ways which will be suggested to one skilled in the art upon a study of this disclosure. It is contemplated that all such practice of the invention will be covered hereby provided it falls within the scope of the appended claims.

We claim:

1. The process of making thiamorpholine which comprises contacting a keto-1,4-thiazane from the group consisting of 3-keto-1,4-thiazane and 3,5-diketo-1,4-thiazane with lithium aluminum hydride in a mutual anhydrous solvent therefor and recovering thiamorpholine from the reaction mixture.

2. The process of making thiamorpholine which comprises dissolving a thiazane from the group consisting of 3-keto-1,4-thiazane and 3,5-diketo-1,4-thiazane in an anhydrous solvent capable of at least partially dissolving both lithium aluminum hydride and said thiazane without reacting with either, and contacting said solution with lithium aluminum hydride, hydrolyzing the reaction mixture, and recovering the liquid thiamorpholine from said reaction mixture.

3. The process according to claim 2 in which the thiazane is 3-keto-1,4-thiazane.

4. The process according to claim 2 in which the thiazane is 3,5-diketo-1,4-thiazane.

5. The process according to claim 2 in which the organic solvent is ethyl ether.

6. The process of making thiamorpholine which comprises refluxing an anhydrous solvent solution of lithium aluminum hydride in contact with a keto-1,4-thiazane from the group consisting of 3-keto-1,4-thiazane and 3,5-diketo-1,4-thiazane, hydrolyzing the reaction mixture, and recovering the liquid thiamorpholine from said reaction mixture.

References Cited in the file of this patent

Krajkeman: "Manufacturing Chemist" (Apr. 1951), pp. 147–56. LiAlH₄ Digest.

Grob et al.: "Helv. Chim. Acta" (Oct. 1950), vol. 33, pp. 1955–60. LiAlH₄ Digest.

Julian et al.: "Jour. Am. Chem. Soc." (Sept. 1949), vol. 71, pp. 3206–7.